July 12, 1955
E. BLANKENSHIP
2,712,782
GARDEN HOE CULTIVATOR
Filed Sept. 7, 1951
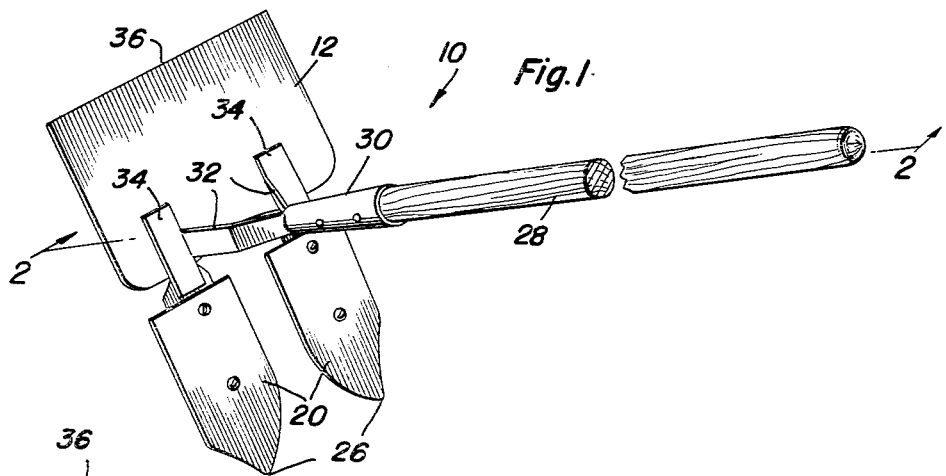
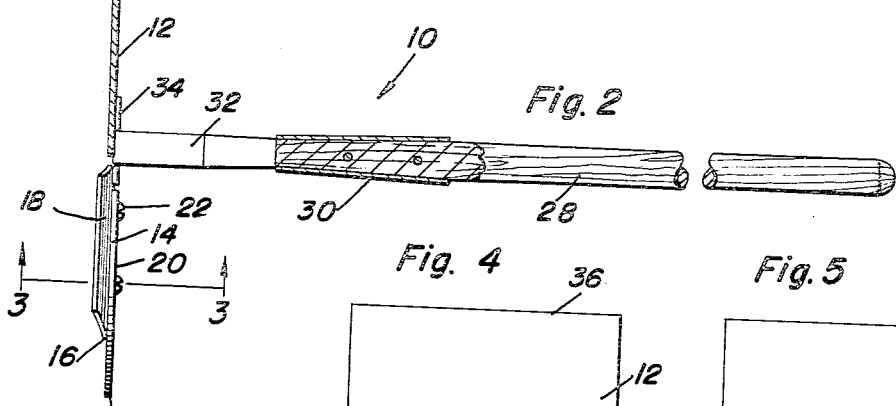
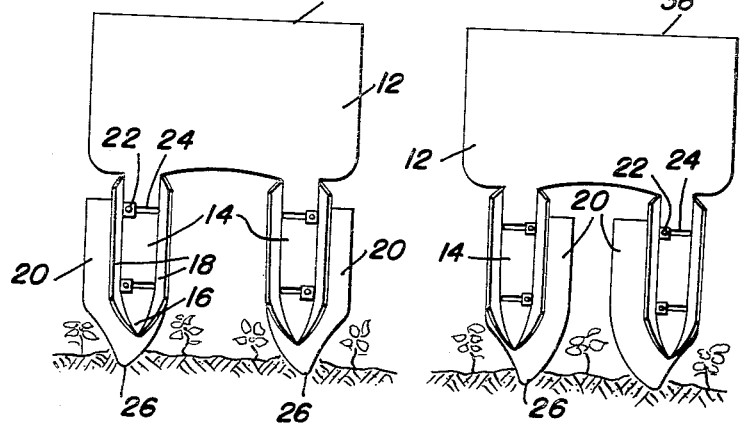
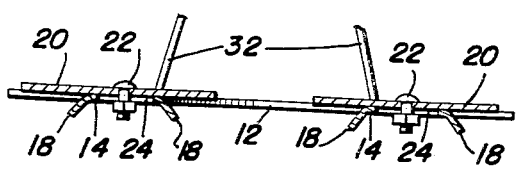
Elijah Blankenship
INVENTOR.

United States Patent Office 2,712,782
Patented July 12, 1955

2,712,782
GARDEN HOE CULTIVATOR

Elijah Blankenship, Austin, Tex.

Application September 7, 1951, Serial No. 245,444

1 Claim. (Cl. 97—67)

This invention relates to new and useful improvements and structural refinements in garden hoes, and the principal object of this invention is to provide an efficient, easily adjustable tool of this type for breaking, loosening and otherwise cultivating the soil for planting as well as for loosening and ridging up the soil along the rows when the plants are in growth.

Some of the advantages of the invention reside in its simplicity of construction, in its efficient adjustability, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention;

Figure 2 is a longitudinal sectional view, taken substantially in the plane of the line 2—2 in Figure 1;

Figure 3 is a sectional view taken substantially in the plane of the line 3—3 in Figure 2; and Figure 4 and 5 are elevational views of the invention adjusted for cultivating double and single rows, respectively.

Like characters of reference are employed to designate like parts in the specification and throughout the several views.

Referring now to the accompanying drawings in detail, the invention consists of a garden hoe cultivator which is designated generally by the reference character 10 and embodies in its construction, a substantially flat blade 12 which is provided at its lower edge with a plurality of transversely spaced, downwardly extending and elongated extensions 14. These extensions have tapered lower ends 16 and are provided at the opposite sides thereof with angulated flanges 18 which are tapered or convergent at their lower ends, in conformity with the convergent or pointed lower ends of the extensions.

A plurality of elongated shovels 20 are provided on the respective extensions 14, and are adjustably secured thereto by suitable bolts 22 extending through transverse slots 24 with which the extensions are formed.

The shovels 20 project downwardly below the lower ends of the extensions 14 and the shovels are provided with pointed ends 26 for penetrating the ground.

By virtue of the slots 24, the shovels 20 may be adjusted toward and away from each other, so that the implement may be used for cultivating between double rows as well as single rows, as illustrated in Figures 4 and 5.

The implement is manipulated by means of a handle 28 which has its lower end secured in a tapered tubular socket 30 of a yoke 32, the end portions of the yoke being provided with angulated flanges 34 which are secured by welding, or the like, to the blade 12 and upper end portions of the extensions 14, as is best shown in Figures 1 and 2.

The blade 12 may be provided with a sharp edge 36, whereby the implement may be used in an inverted position as a hoe.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

A garden tool comprising a hoe blade, a pair of transversely spaced, elongated extensions formed integrally with the back edge of said hoe blade, rearwardly divergent longitudinal marginal flanges on the extensions, said extensions having transverse slots therein terminating adjacent the flanges, shovels mounted for transverse adjustment on the fronts of the extensions, bolts on said shovels extending through the slots and adjustable therein, nuts threaded on said bolts for securing the shovels in adjusted position, said nuts being laterally engageable with the flanges for retention thereby against retrograde rotation, a yoke including elongated, outturned flanges on its ends fixed on the hoe blade and the adjacent portions of the extensions, a socket on the bight portion of said yoke, and a handle mounted in said socket.

References Cited in the file of this patent

UNITED STATES PATENTS

| | | |
|---|---|---|
| 1,133,221 | Berg | Mar. 23, 1915 |
| 1,298,841 | West | Apr. 1, 1919 |
| 1,302,290 | Black et al. | Apr. 29, 1919 |
| 1,622,665 | Nix | Mar. 29, 1927 |

FOREIGN PATENTS

| | | |
|---|---|---|
| 458,343 | France | Aug. 4, 1913 |
| 380,533 | Germany | Sept. 10, 1923 |